United States Patent
Vizza

[15] 3,641,769
[45] Feb. 15, 1972

[54] ANTIPOLLUTION CARBURETOR ATTACHMENT

[72] Inventor: Joseph Vizza, 414 Broad Avenue, Belle Vernon, Pa. 15012

[22] Filed: Jan. 16, 1970

[21] Appl. No.: 3,282

[52] U.S. Cl. ..................................60/30, 60/31, 123/25 B
[51] Int. Cl. ........................................F01n 3/00, F02d 21/00
[58] Field of Search ...................60/30, 31; 123/25 P, 25 B

[56] References Cited

UNITED STATES PATENTS

| | | | |
|---|---|---|---|
| 1,496,189 | 6/1924 | Waterman | 60/30 |
| 1,686,470 | 10/1928 | Schwertner | 123/25 B |
| 2,880,079 | 3/1959 | Cornelius | 60/30 |
| 2,919,540 | 1/1960 | Percival | 60/31 |
| 2,977,940 | 4/1961 | Theriault | 123/25 B |

FOREIGN PATENTS OR APPLICATIONS

| | | | |
|---|---|---|---|
| 432,817 | 8/1935 | Great Britain | 123/25 B |

*Primary Examiner*—Douglas Hart
*Attorney*—Victor J. Evans & Co.

[57] ABSTRACT

A carburetor attachment is disclosed for selectively feeding water vapors into the air intake of a carburetor through the conduit which contains the PVC valve or directly to the exhaust pipe. The water vapors are fed from a source of heated water such as the radiator, and tanks which are heated by the exhaust pipe or the muffler from the internal combustion engine.

6 Claims, 8 Drawing Figures

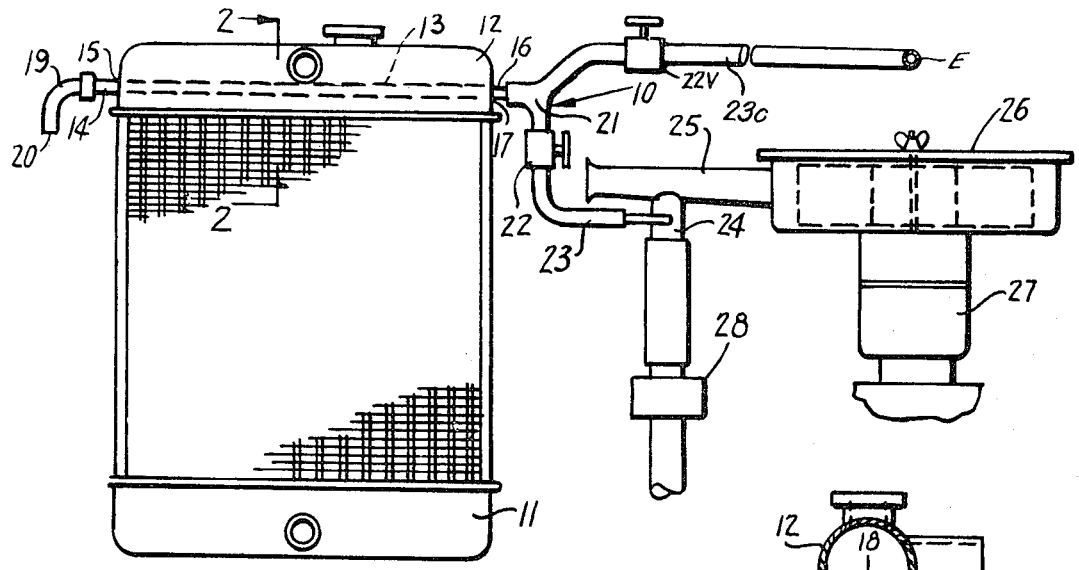
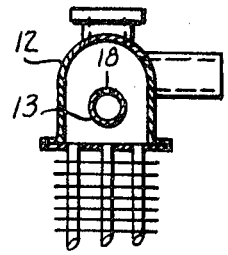
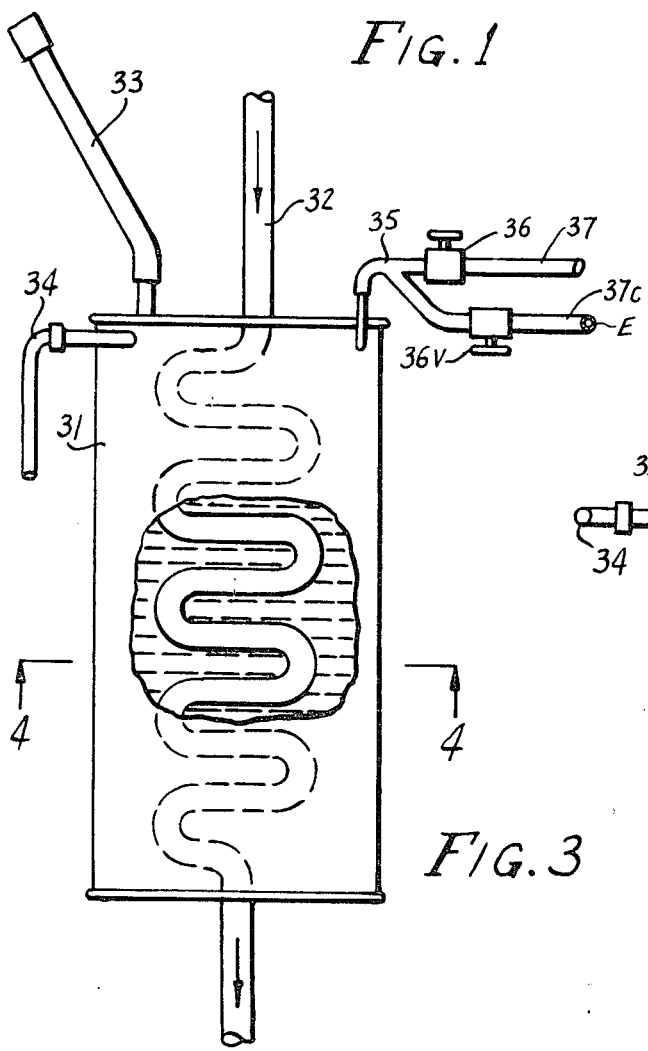

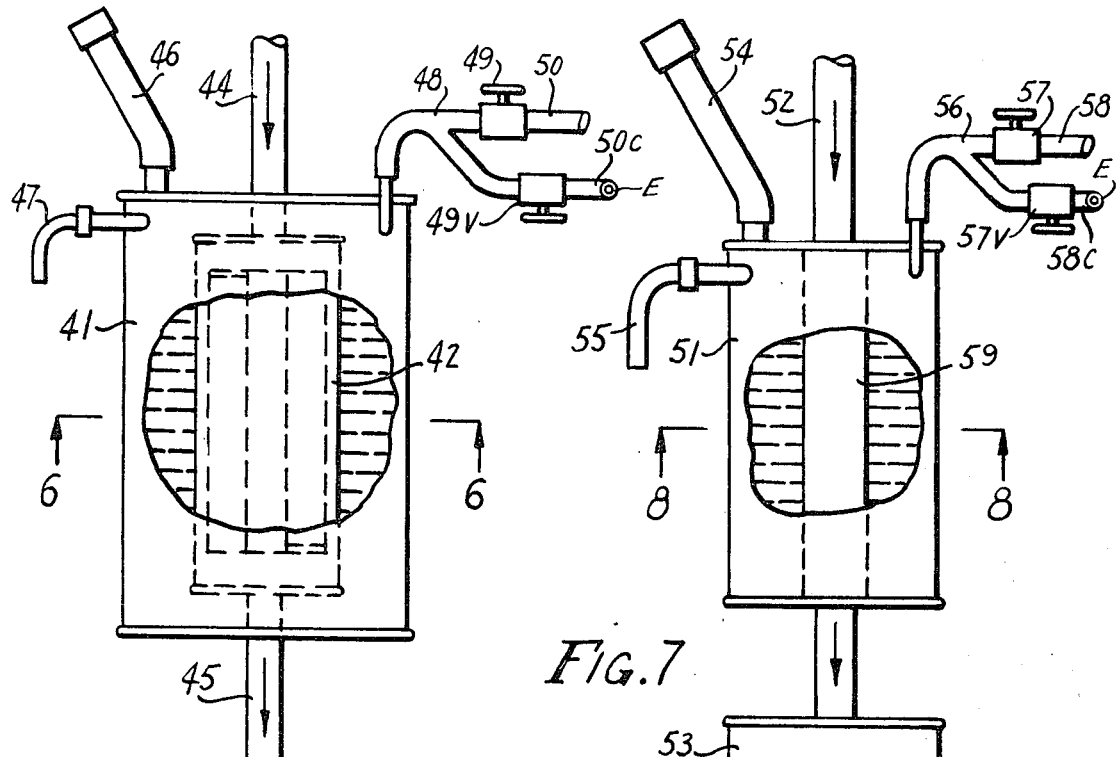
Fig. 5
Fig. 7
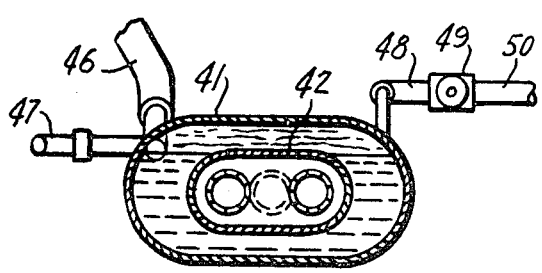
Fig. 6
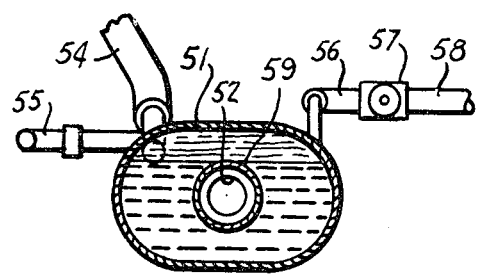
Fig. 8

3,641,769

ANTIPOLLUTION CARBURETOR ATTACHMENT

BACKGROUND OF THE INVENTION

Field of the Invention

The present invention relates to the reduction of noxious air pollutants emitted by an internal combustion engine by feeding water vapors into the exhaust system or into the air intake of the carburetor while the engine is in operation.

SUMMARY OF THE INVENTION

The present invention is directed to air pollution reducing attachment for the carburetor of internal combustion engines. Water vapors are drawn from a source of warm water such as a radiator of a car or auxiliary heated water tanks and fed into the air intake of the carburetor through the conduit which holds the PVC valve or are fed direct to the exhaust pipe of the engine. Moisture when fed into the carburetor substantially reduces the carbon monoxide gases emitted by the engine while simultaneously improving the gas mileage and causing the engine to run quieter.

The primary object of the invention is to provide an antipollution attachment for carburetors or exhaust systems of internal combustion engines which will reduce the carbon monoxide pollutants from the engine.

Other objects and advantages will become apparent in the following specification when considered in light of the attached drawings.

BRIEF DESCRIPTION OF THE DRAWINGS

FIG. 1 is an elevational view of the invention shown partially broken away for convenience of illustration;

FIG. 2 is an enlarged fragmentary vertical sectional view taken along the line 2—2 of FIG. 1 looking in the direction of the arrows;

FIG. 3 is an elevational view of a modified form of the invention shown partially broken away and in section for convenience of illustration;

FIG. 4 is a transverse sectional view taken along the line 4—4 of FIG. 3 looking in the direction of the arrows;

FIG. 5 is an elevational view of another modified form of the invention shown partially broken away and in section for convenience of illustration;

FIG. 6 is a transverse sectional view taken along the lines 6—6 of FIG. 5 looking in the direction of the arrows;

FIG. 7 is an elevational view of still another modified form of the invention shown partially broken away and in section for convenience of illustration; and FIG. 8 is a transverse sectional view taken along the line 8—8 of FIG. 7 looking in the direction of the arrows.

DESCRIPTION OF THE PREFERRED EMBODIMENT

Referring now to the drawings in detail wherein like reference characters indicate like parts throughout the several figures the reference numeral 10 indicates generally an antipollution attachment for carburetors constructed in accordance with the invention.

The attachment 10 is connected to a conventional radiator 11 having a top tank 12 through which a copper tube 13 extends. The copper tube 13 has a projection 14 at one end which is soldered at 15 to the end of the top tank 12. A projection 16 is formed on the copper tube 13 at the end thereof opposite the projection 14 and this is soldered at 17 to the end of the top tank 12. The copper tube 13 has perforations 18 formed in its upper face within the top tank 12.

An air inlet elbow 19 is secured to the projection 14 and has its open end 20 projecting downwardly. A Y-fitting 21 is secured to the projection 16 and has a hand control shutoff valve 22 secured to one branch and a similar valve 22v secured to the opposite branch. A conduit 23 extends from the valve 22 to the conduit 24 forming part of the air intake 25 of the air cleaner 26. The air cleaner 26 is associated with the conventional carburetor 27 and the conduit 24 extends upwardly from a PVC valve 28 of conventional construction. A conduit 23c extends from the valve 22v directly to the exhaust pipe E of the engine.

When the valve 22 is open with the valve 22v closed and the internal combustion engine is in operation air will flow through the air inlet 20 then flow with water vapors through the perforations 18 into the copper tube 13 where they will flow into the conduit 24 and then into the carburetor 27 to provide the desired moisture containing air to reduce the carbon monoxide gases formed in the operation of the internal combustion engine. It has been found that the internal combustion engine will give better gas mileage after the installation of this device and will operate quieter.

In FIGS. 3 and 4 a modified form of the invention is illustrated wherein a tank 31 mounted adjacent the internal combustion engine and has an exhaust pipe 32 extending through the tank 31 in a zigzag path exiting at the bottom thereof. A filler pipe 33 extends into the tank 31 in order for it to be filled with water. An air inlet pipe 34 is connected to the tank 31 to permit air to flow into the top of the tank as required.

A Y-fitting 35 extends from the upper portion of the tank 31 and has a hand-controlled valve 36 connected to one branch thereof and a valve 36v connected to the opposite branch thereof permitting the branches to be individually closed off when desired. A pipe 37 extends from the valve 36 to the carburetor (not shown) in the same manner as the preferred form of the invention and a pipe 37c extends from the valve 36v directly to the exhaust pipe E of the engine.

In the modified form of the invention illustrated in FIGS. 3 and 4 at least a portion of the exhaust gases are diverted through the exhaust pipe 32 to heat the water in the tank 31 so that water vapors will be present in the upper end of the tank 31. The operation of the form of the invention illustrated in FIGS. 3 and 4 is identical to the operation of the preferred form of the invention.

In FIGS. 5 and 6 another modified form of the invention is illustrated wherein a water tank 41 surrounds a conventional muffler 42 which is connected to an exhaust pipe 44 and to a tailpipe 45 in a conventional manner. A filler pipe 46 is connected to the tank 41 to permit water to be poured into the tank 41. An air inlet pipe 47 is connected to the tank 41 to permit a flow of air to enter the tank 41. A Y-fitting 48 is connected to the tank 41 and has a hand-controlled valve 49 connected to one branch thereof and a valve 49v connected to the other branch. A pipe 50 extends from the hand control valve 49 to a carburetor (not shown) in the same manner as disclosed in the preferred form of the invention in FIG. 1. A pipe 50c extends from the valve 49v to the exhaust pipe E.

The operation of the form of the invention illustrated in FIGS. 5 and 6 is identical to that of the form of the invention illustrated in FIG. 3 with the muffler 42 heating the water in the tank 41 to provide the desired water vapors.

In FIGS. 7 and 8 still another modified form of the invention is illustrated wherein a water tank 51 has the exhaust pipe 52 extending therethrough on its way to a muffler 53. A filler pipe 54 is provided for pouring water into the tank 51 and an air inlet pipe 55 is connected to the tank 51 and an air inlet pipe 55 is connected to the tank 51 to permit a flow of air into the tank 51 as required. The water vapor Y-fitting 56 is connected to the tank 51 and has one branch which extends to a valve 57 controlled by hand and a second branch extending to a valve 57v. A pipe 58 leads from the hand control valve 57 to the carburetor (not shown) in exactly the same manner as illustrated in the preferred form of the invention in FIG. 1. A pipe 58c extends from the valve 57v to the exhaust pipe E. The tank 51 has a central cylindrical pipe 59 extending therethrough with the exhaust pipe 52 arranged coaxially therein but inwardly spaced therefrom.

The operation of the form of the invention illustrated in FIGS. 7 and 8 is identical to that of the form of the invention illustrated in FIG. 3 with the water in the tank 51 being heated by the exhaust gases in the exhaust pipe 52.

Having thus described the preferred embodiments of the invention it should be understood that numerous structural modifications and adaptations in addition to those illustrated may be resorted to without departing from the spirit of the invention.

I claim:

1. An antipollution attachment for internal combustion engine carburetors comprising a tank of warm water, means connected to the upper portion of said tank for conducting water vapors therefrom, and selective means extending to the air intake of an internal combustion engine carburetor and to the exhaust pipe connected to said last-named means for conducting water vapors from said tank selectively to said carburetor or to said exhaust pipe.

2. A device as claimed in claim 1 wherein means are provided for admitting air to said tank as water vapors are withdrawn therefrom.

3. A device as claimed in claim 2 wherein said tank is the cooling radiator of the internal combustion engine.

4. A device as claimed in claim 2 wherein said tank is an auxiliary tank and means connected to the exhaust system of the internal combustion engine heats the water in said tank.

5. A device as claimed in claim 4 wherein said tank surrounds the muffler of the exhaust system and is heated thereby.

6. A device as claimed in claim 4 wherein said tank surrounds the exhaust pipe of said exhaust system and is heated thereby.

* * * * *